United States Patent
Blum et al.

(10) Patent No.: US 7,654,667 B2
(45) Date of Patent: Feb. 2, 2010

(54) PROGRESSIVE ADDITION LENS OPERATING IN COMBINATION WITH A MULTI-ORDER DIFFRACTIVE OPTIC

(75) Inventors: Ronald D. Blum, Roanoke, VA (US); William Kokonaski, Gig Harbor, WA (US); Joshua N. Haddock, Roanoke, VA (US)

(73) Assignee: PixelOptics, Inc., Roanoke, VA (US)

( * ) Notice: Subject to any disclaimer, the term of this patent is extended or adjusted under 35 U.S.C. 154(b) by 0 days.

(21) Appl. No.: 12/118,226

(22) Filed: May 9, 2008

(65) Prior Publication Data

US 2008/0278681 A1 Nov. 13, 2008

Related U.S. Application Data

(60) Provisional application No. 60/924,344, filed on May 10, 2007.

(51) Int. Cl.
*G02C 7/06* (2006.01)
(52) U.S. Cl. ...................................... 351/169
(58) Field of Classification Search ............... 351/168, 351/169, 172; 359/558, 565, 566
See application file for complete search history.

(56) References Cited

U.S. PATENT DOCUMENTS 6,270,220 B1 * 8/2001 Keren .......................... 351/169
6,619,799 B1 9/2003 Blum et al.
7,093,938 B2 8/2006 Morris et al.

OTHER PUBLICATIONS

International Search Report for International Application No. PCT/US08/06024, completed Sep. 19, 2008, pp. 1-7.

* cited by examiner

*Primary Examiner*—Scott J Sugarman
(74) *Attorney, Agent, or Firm*—Townsend and Townsend and Crew LLP (57) ABSTRACT

A multi-focal spectacle lens is presented having far distance, intermediate distance, and near distance vision correction, in which the lens includes a progressive addition surface with a progression of optical power. The lens further includes a multi-order diffractive surface relief structure with an optical add power. The multi-order diffractive structure reduces chromatic aberration as compared to a conventional diffractive structure of equivalent optical power. The lens may also include a wavefront splitting device diffractive structure for generating multiple optical powers simultaneously. When the progressive addition surface and the multi-order diffractive surface relief structure are in optical communication an overall progression of optical add power may be provided by the combination of the progressive addition surface with the multi-order surface relief diffractive structure.

15 Claims, 6 Drawing Sheets

PROGRESSIVE ADDITION LENS OPERATING IN COMBINATION WITH A MULTI-ORDER DIFFRACTIVE OPTIC

CROSS REFERENCE TO RELATED APPLICATIONS

This application claims priority from and incorporates by reference in its entirety the following provisional application:

U.S. Ser. No. 60/924,344 filed on May 10, 2007 and entitled "Multi-focal progressive addition spectacle lens operating in conjunction with a multi-order diffractive optical device".

BACKGROUND OF THE INVENTION

A multi-focal lens typically has multiple regions each having a different optical power. The transition between the regions of different optical power may be either abrupt, as is the case for bifocal and trifocal lenses, or smooth and continuous, as is the case with Progressive Addition Lenses (PALs). Progressive Addition Lenses are a type of multi-focal lens that comprise a gradient of continuously increasing positive optical power from the beginning of a far distance viewing zone of the lens to a near distance viewing zone in the lower portion of the lens. This progression of optical power generally starts at approximately what is known as the fitting cross or fitting point of the lens and continues until the full add power is realized in the near distance viewing zone. Typically, the optical power then plateaus. Progressive Addition Lenses utilize a variable curvature surface on one or both exterior surfaces of the lens that is shaped to create this progression of optical power. Progressive Addition Lenses are advantageous over traditional bifocal and trifocal lenses in that they provide a lineless, cosmetically pleasing multi-focal lens with a continuous vision correction from a far distance to a near distance.

Using PALs, however, presents problems. One problem is that PALs have serious vision compromises that include, but are not limited to, unwanted astigmatism, distortion, and perceptual blur, especially for large near distance corrections (large near add powers). In addition, many wearers of PALs experience an unpleasant effect known as visual motion (often referred to as "swim") due to the distortion that exists in the lenses.

To minimize these problems, the overall optical power of PALs may be reduced to provide a wearer with a desired optical power less than the wearer's needed near distance optical power correction. The remaining optical power may be provided by a diffractive optical element which generate little or no additional unwanted astigmatism, distortion, perceptual blur, or swim.

While the use of a diffractive optical element in combination with a low power PAL may considerably reduce visual distortion of the PAL (especially for large total add powers), the diffractive lens may itself introduce new unwanted effects, e.g., noticeable chromatic aberrations in higher prescriptions due to the highly dispersive nature of diffractive optical elements.

There is therefore a great need in the art for providing a PAL in combination with a diffractive lens, while minimizing the chromatic aberrations of the diffractive optical element. Accordingly, there is now provided with this invention an improved lens for effectively overcoming the aforementioned difficulties and longstanding problems inherent in the art.

SUMMARY OF THE INVENTION

In an embodiment of the invention, a multi-focal spectacle lens having far distance, intermediate distance, and near distance vision correction, may include a progressive addition surface with a progression of optical power for providing the intermediate distance and near distance vision correction. The ophthalmic lens may further include a multi-order diffractive surface relief structure with an optical add power for reducing chromatic aberrations. When the progressive addition surface and the multi-order diffractive surface relief structure are in optical communication an overall progression of optical add power may be provided by the combination of the progressive addition surface with the multi-order diffractive surface relief structure.

In an embodiment of the invention, an ophthalmic lens having far distance, intermediate distance, and near distance vision correction, may include a front piece having a front convex surface, a back piece having a rear concave surface, and a multi-order diffractive surface relief structure positioned between the front piece and the back piece, where the diffractive lens structure has an optical add power and reduces chromatic aberration. The ophthalmic lens may further include a portion of a progressive addition surface provided on at least one of the front surface or the rear surface in optical communication with the diffractive lens structure, where an overall progression of optical add power may be provided by the addition of the progressive addition surface and the optical add power of the diffractive lens structure.

BRIEF DESCRIPTION OF THE DRAWINGS

Specific embodiments of the present invention will be described with reference to the following drawings, wherein.

DESCRIPTION OF THE PREFERRED EMBODIMENT

Figure 1:
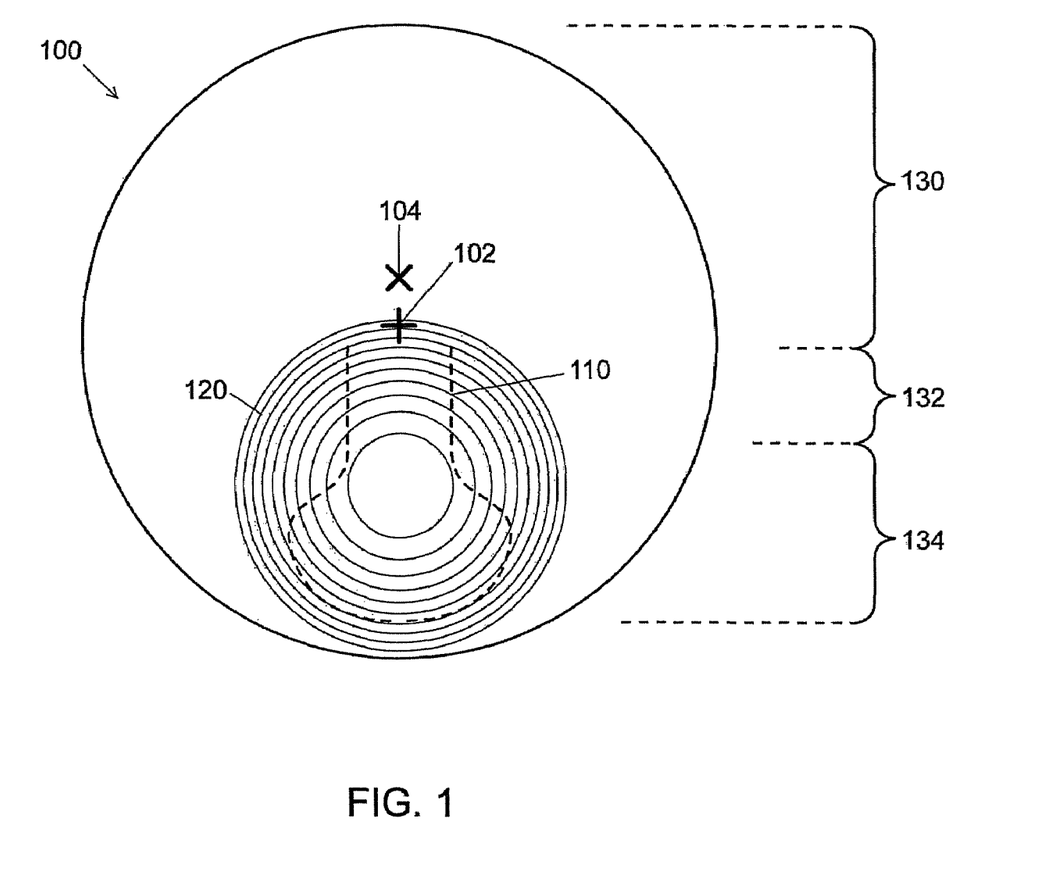
FIG. 1 shows a front view of a lens 100 having a progressive addition region and a diffractive addition region.

FIG. 1 shows a front view of a lens 100 having a progressive addition region 110 and a diffractive addition region 120.

The progressive addition region 110 is a low add power PAL designed to provide a wearer with an optical power less than the wearer's needed near distance optical power correction. For example, the add power of the PAL may be 50% of the required near distance optical power correction.

The diffractive addition region 120 is in optical communication with the progressive addition region. The diffractive addition region at least partially, and preferably largely, overlaps the progressive addition region. When used with the progressive addition region, the diffractive addition region provides the remaining optical power to provide the wearer's total needed near distance optical power correction. The diffractive addition region may be a multi-order diffractive (MOD) lens, e.g., as described by Faklis et al. (U.S. Pat. No. 5,589,982) and Morris et al. (U.S. Pat. No. 7,025,456), which are both incorporated herein by reference. MOD lenses have a diffractive surface relief structure that focuses multiple wavelengths of light from multiple diffractive orders at a common point in space. MOD lenses are known to reduce the high levels of chromatic aberration typically associated with conventional diffractive lenses (especially for large optical powers).

The lens 100 includes a distance vision region 130, an intermediate vision region 132, and a near vision region 134. The near vision region may be located, for example, where the progressive addition region has a maximum add power and coincides with the center of the diffractive addition region. The intermediate vision region may be located, for example, where the progressive addition region has less than its maximum add power and coincides with the center of the diffractive addition region. The distance vision region may be located, for example, where the progressive addition region and the diffractive addition region are absent. The lens has a geometric (or physical) center 102 and a fitting point 104. Typically, the distance vision region is located on the upper half of the viewing region of the lens above the fitting point. The fitting point is designed to coincide with the location of the wearer's pupil and marks the start of the optical power progression (the progressive channel) from the distance vision region to the near vision region.

The diffractive addition region 120 (especially one having a MOD surface relief structure) is complex and the region is typically fabricated and embedded within the lens at the time of manufacture. The lens may be a finished lens or an unfinished lens, and preferably, is a semi-finished lens blank. The lens may be adjusted e.g., finished, in a lens laboratory to the wearer's prescription using methods known in the art.

Figure 2A:
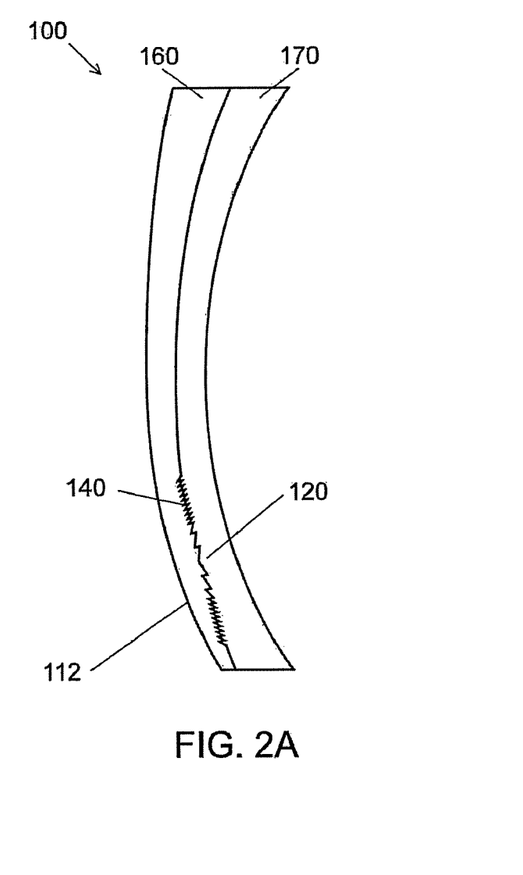
FIGS. 2A and 2B show side views of the lens of FIG. 1 having a multi-order diffractive surface relief structure and the progressive addition region on the front and the back surfaces of the lens, respectively.
Figure 2B:
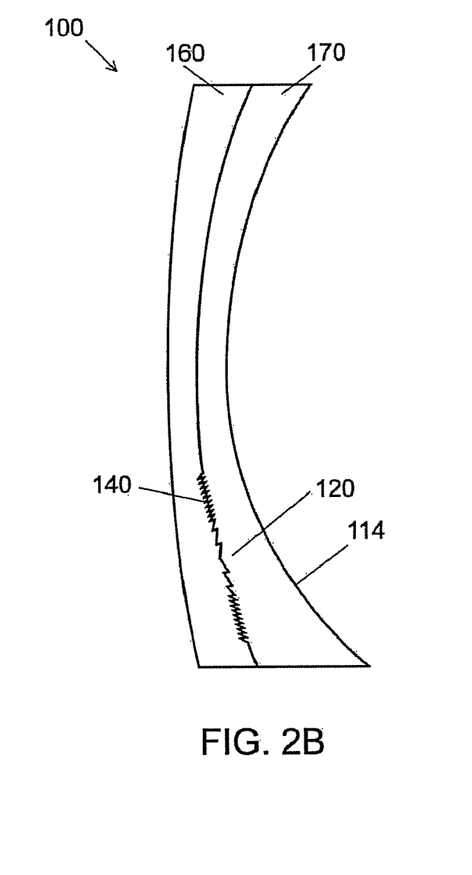

FIGS. 2A and 2B show side views of the lens 100 of FIG. 1 having a front piece 160 and a back piece 170 forming from the front (convex) and back (concave) surfaces, respectively.

FIG. 2A has a progressive addition region 112 disposed on the front (convex) surface of the front piece 160 of the lens. FIG. 2B has a progressive addition region 114 disposed on the back (concave) surface of the back piece 170 of the lens. In another embodiment (not shown), the lens may have progressive addition regions disposed on both the front and back surfaces of the lens. For example, the front surface progressive addition region 112 of FIG. 2A having a portion of progressive optical power may be combined with the back surface progressive addition region 114 FIG. 2B having a portion of progressive optical power to form a lens having the total progressive optical power. Typically, the front surface progressive addition region 112 of FIG. 2A is formed at the time of lens blank manufacture (e.g., by casting or molding). The back surface progressive addition region 114 of FIG. 2B is typically formed at the time of prescription surfacing (e.g., by means of free-forming technology).

In each of FIGS. 2A and 2B, the lens 100 has a diffractive addition region 120 disposed between the inner surfaces of the front and back pieces 160 and 170. The diffractive addition region has a MOD surface relief structure 140. The MOD surface relief structure may be formed integral to the inner surfaces of one or both of the front and the back pieces. The front and back pieces may be manufactured by many methods known in the art, for example, by casting resin, injection molding from a thermo-plastic, or diamond turning. For example, a high precision machining technique, e.g., a single point diamond turning may be used to fabricate an inverse topological profile of the MOD surface relief structure onto a surface of a casting or molding tool, from which one or both of the front and back pieces are manufactured. In one embodiment, the front and back pieces may be made separately and then joined together with an adhesive. Alternatively, one of the pieces is made first and then the other piece is cast or molded thereonto.

The front piece 160 of the lens has a first refractive index, $n_1$, and the back piece 170 of the lens has a second refractive index, $n_2$, different from the first refractive index. The difference in refractive index between the two materials provides a phase retardation of incident optical wavefronts propagating across the MOD surface relief structure such that a high focusing efficiency (i.e. diffraction efficiency) is achieved, e.g., as described in Morris et. al., U.S. Pat. No. 7,025,456. For example, one of the front or back pieces of the lens may be cast from CR39 resin (n=1.49) and the other injection molded from polycarbonate (n=1.60). Any combination of ophthalmic lens materials may be used including, for example, Trivex (n=1.53), Hoya 1.60 (n=1.60), Mitsui MR10 (n=1.67), and Essilor Thin & Lite (n=1.74).

Figure 3A:
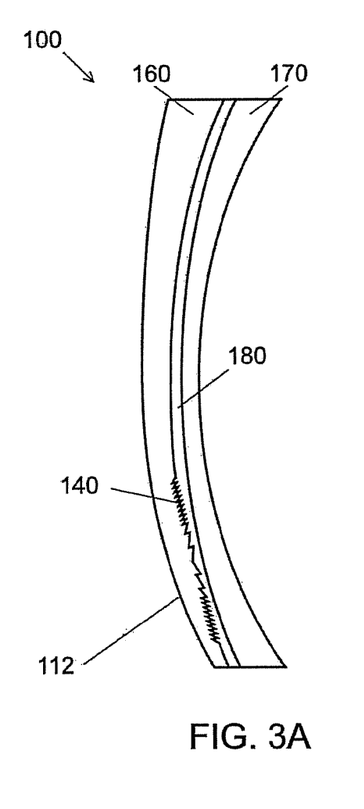
FIGS. 3A and 3B show side views of the lens of FIG. 1 having a multi-order diffractive surface relief structure and the progressive addition region on the front and the back surfaces of the lens, respectively, and a thin film layer disposed between the front and the back surfaces of the lens.
Figure 3B:
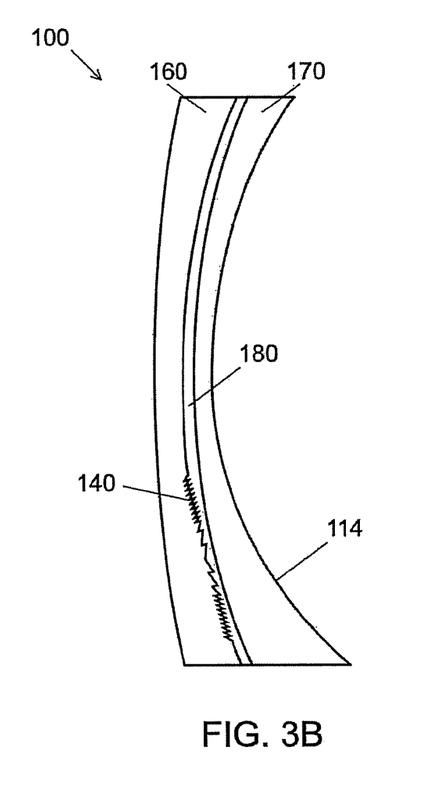

FIGS. 3A and 3B show side views of the lens 100 of FIG. 1 having a multi-order diffractive surface relief structure and the progressive addition region 110 on the front and the back surfaces of the lens, respectively, and a thin film layer 180 disposed between the front piece 160 and the back piece 170 of the lens.

The thin film layer 180 may have the MOD surface relief structure 140 in certain embodiments of the invention. The thin film layer may be composed of transparent material having a refractive index, $n_3$. In this embodiment, the refractive indices, $n_1$ and $n_2$, of the front and back pieces 160 and 170 may be the same or different. However, the refractive index, $n_3$, of the thin film layer having the MOD surface relief structure must be different from either of the refractive indices, $n_1$ and $n_2$, of the front and back pieces. The difference in the refractive indices in combination with the proper profile of the MOD surface relief structure causes the lens to have a high focusing efficiency.

The thin film layer may be, for example, embossed, stamped, cast, or molded with the MOD surface relief structure, as is well known in the art. The thin film layer may then be embedded into the lens, e.g., in a manner similar to that used to embed polarizing films to make polarizing sun lenses. Alternatively, the inner surface of one or both of the front and/or back pieces of the lens may be fabricated with the MOD surface relief structure. An uncured (e.g., liquid) optical resin or adhesive may be injected between the pieces of the lens. The injected material may be cured to solidify and form the thin film layer.

Figure 4A:
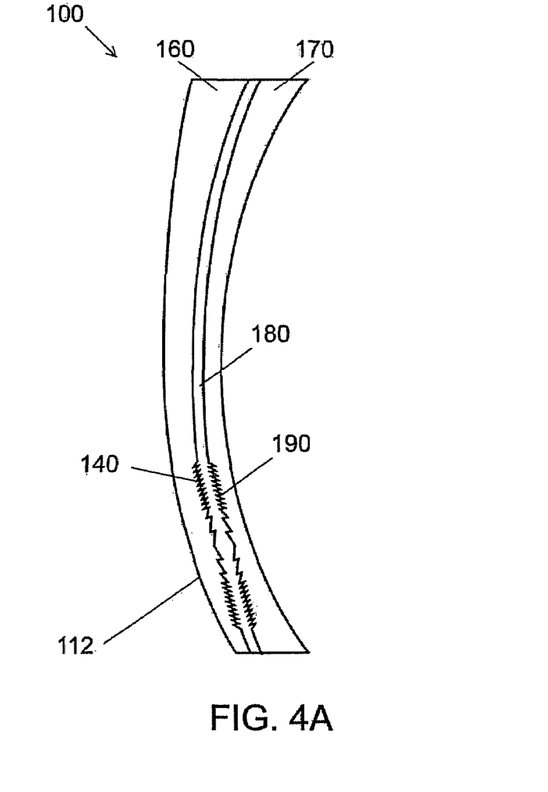
FIGS. 4A and 4B show side views of the lens of FIG. 1 having a diffractive wavefront splitting device optical region in optical communication with a multi-order diffractive surface relief structure.
Figure 4B:
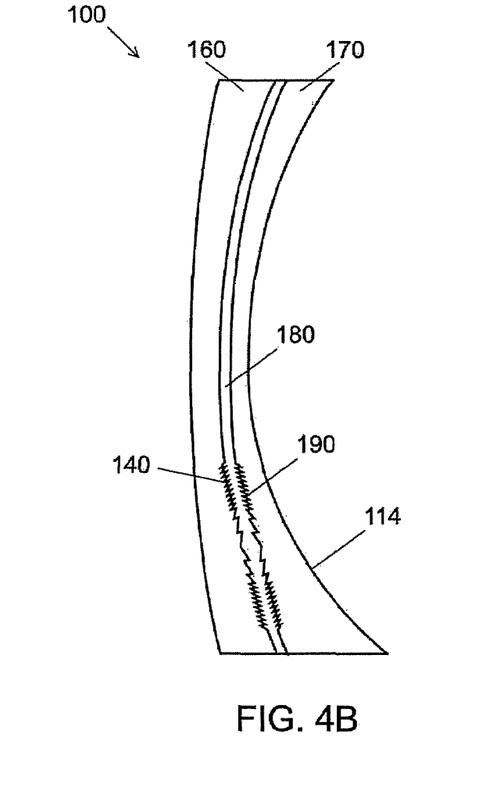

FIGS. 4A and 4B show side views of the lenses 100 of FIG. 1, having a wavefront splitting device (WSD) surface relief structure 190 and the MOD surface relief structure 140. The WSD surface relief structure and the MOD surface relief structure are in optical communication. The WSD surface relief structure is, e.g., as described in U.S. Pat. No. 7,025,456 to Morris et al.

The WSD surface relief structure 190 has a surface relief diffractive profile that splits the energy of an incident wavefront equally into a predetermined number of diffraction orders, each with a distinct optical power (i.e., focal length). For example, a wavefront propagating across the WSD surface relief structure may have 50% of its energy diffracted into a first diffractive order corresponding to a first optical power and the other 50% of its energy diffracted into a second diffractive order corresponding to a second optical power. Thus, the WSD surface relief structure formed within the lens may provide two distinct optical powers, e.g., +1.00 diopters (D) and −1.00 D. Subsequent to propagating across the WSD surface relief structure, the wavefront propagates across the MOD surface relief structure 140. Since the MOD surface relief structure is in optical communication with the WSD surface relief structure, the optical power resulting from each diffractive order is the sum of the optical power associated with the diffractive order generated by the WSD surface relief structure and the optical power of the MOD surface relief structure. For example, the MOD surface relief structure may provide +2.00 D of optical power. Thus, the optical powers of +1.00 D and −1.00 D corresponding to the diffractive orders generated by the WSD surface relief structure, in combination with +2.00 D of optical power provided by the MOD surface relief structure, will provide a total of +3.00 D and +1.00 D of optical power, respectively. Thus, light propagating across the WSD and MOD surface relief structures may experience multiple optical powers simultaneously, and thus, generate multiple images. A wavefront may propagate across the MOD surface relief structure and the WSD surface relief structure in any order (e.g., propagating across the MOD first and the WSD second, or visa versa) with the same result.

When the WSD and the MOD surface relief structures are in optical communication with each other and the wearer's eye, multiple images may be projected onto the retina This approach, taught by Morris et al., provides a multi-focal effect, such that, at any point in time, one image is in focus and the other(s) are out of focus. The wearer may learn to disregard the image(s) which are not in focus for a particular visual task (e.g. disregard an image for distance vision when reading). Such an approach, however, does provide a continuous range of focuses.

In FIGS. 4A and 4B, the combined MOD and WSD surface relief structures are in optical communication with the progressive addition regions 112 and/or 114, respectively. The combined MOD and WSD surface relief structures provide multiple images, each having different optical powers, while the progressive addition region provides additional optical power, which increases smoothly and continuously over the length of the progressive channel.

In each of the lenses 100 of FIGS. 1, 2A, 2B, 3A and 3B, the MOD surface relief structure 140 may be replaced with the combined MOD and WSD surface relief structures of FIGS. 4A and 4B. When the lens 100 of FIGS. 2A and 2B is fabricated by casting or molding one of front or back pieces 160 and 170 from the other, the MOD and WSD surface relief structures are constructed on the same surface. For the lens 100 of FIGS. 3A and 3B, having the thin film layer 180, the MOD and WSD surface relief structures may be embossed, stamped, cast, or molded, on opposite surfaces of (as shown in FIGS. 4A and 4B) or together on the same surface (not shown) of the thin film layer. Alternatively, when the embedded thin film layer is formed by injecting an uncured resin or adhesive, the MOD and WSD surface relief structures are fabricated on the (same or opposite) inner surfaces of the front and/or back pieces 160 and 170 of the lens. In FIGS. 1, 2A, 2B, 3A, 3B, 4A and 4B, the MOD and WSD surface relief structures may be located below the fitting point of the progressive addition regions.

The back (concave) surface of the lens (on the back of the back piece 170 in FIGS. 2A, 2B, 3A 3B, 4A and 4B, and not shown in FIG. 1) may be ground and polished or free-formed, to provide any additional (sphere and/or cylinder) correction needed to achieve the wearer's far distance optical power correction.

Figure 5:
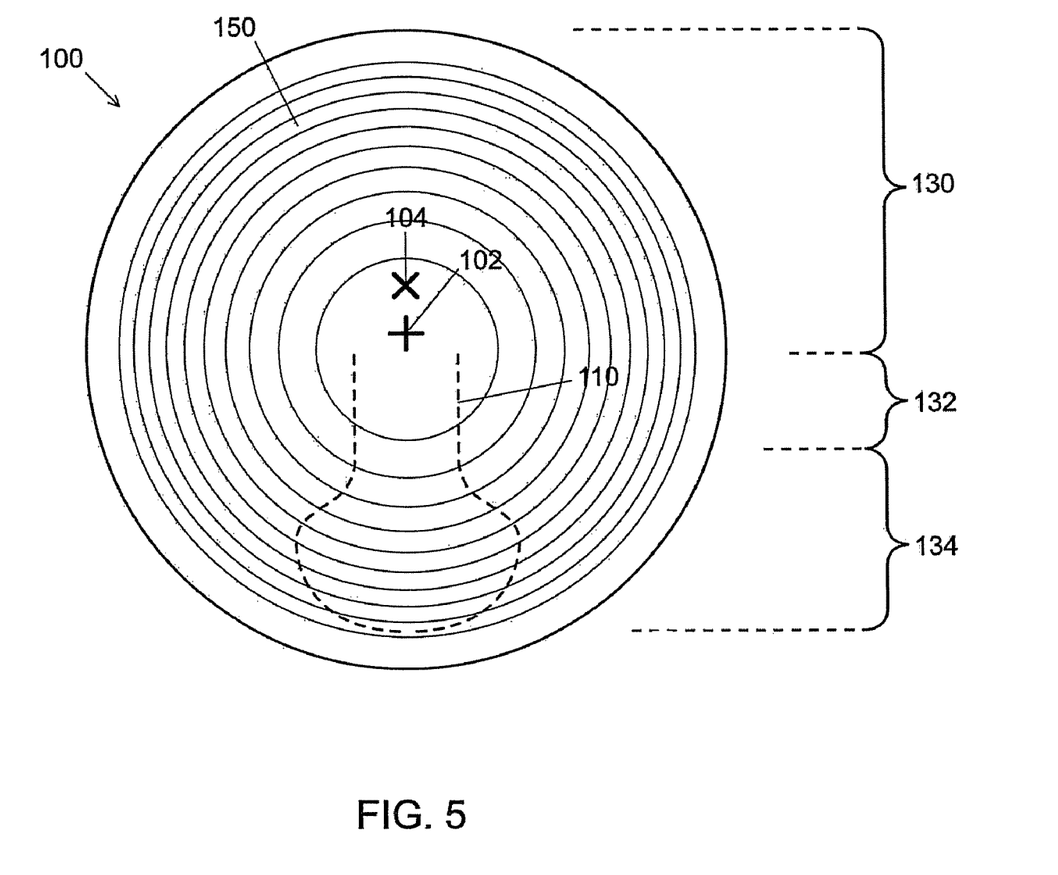
FIG. 5 shows a front view of the lens of FIG. 1 having a diffractive addition region that extends radially toward the peripheral edge of the lens.

FIG. 5 shows a front view of the lens 100 having a diffractive addition region 150 that extends radially toward the peripheral edge of the lens. For example, the diffractive addition region may cover an entire surface of the lens (internal and/or external). The diffractive addition region may provide optical power in each of the distance, intermediate, and near vision regions 130, 132, and 134. For example, the diffractive addition region may provide one power for distance vision and another power for near vision. The diffractive may be located above the fitting point 104 of the low add power progressive addition region 110.

The diffractive addition region 150 may be a MOD surface relief structure or combined MOD and WSD surface relief structures.

By way of example only, consider a spectacle prescription for a presbyopic patient, the prescription being: −2.00 D −0.75 D×125° with +2.25 D of add power. The diffractive addition region 150 having combined MOD and WSD surface relief structures, provides (either fully, or a portion of) a sphere distance correction of −2.00 D, using one of the two or more optical powers of the MOD and WSD surface relief structures. Any remaining optical power for distance vision correction may be generated by refraction via the curvatures of the front and back optical surfaces of the lens. Additionally, correction of the −0.75 D of cylindrical distance vision error may be generated by refraction via an astigmatic surface either ground and polished or free-formed into the back surface of the lens. Finally, correction of the +2.25 D of near vision error may be split between the second of the two optical powers of the MOD and WSD surface relief structures (e.g., a +1.25 D contribution) and the progressive addition surface (e.g., a +1.00 D contribution). In this example, the progressive addition surface contributes only a portion (e.g., +1.00 D) of the total needed add power to limit the amount of blur and/or distortion generally associated with the progressive addition surface (especially for large total add powers).

Figure 6:
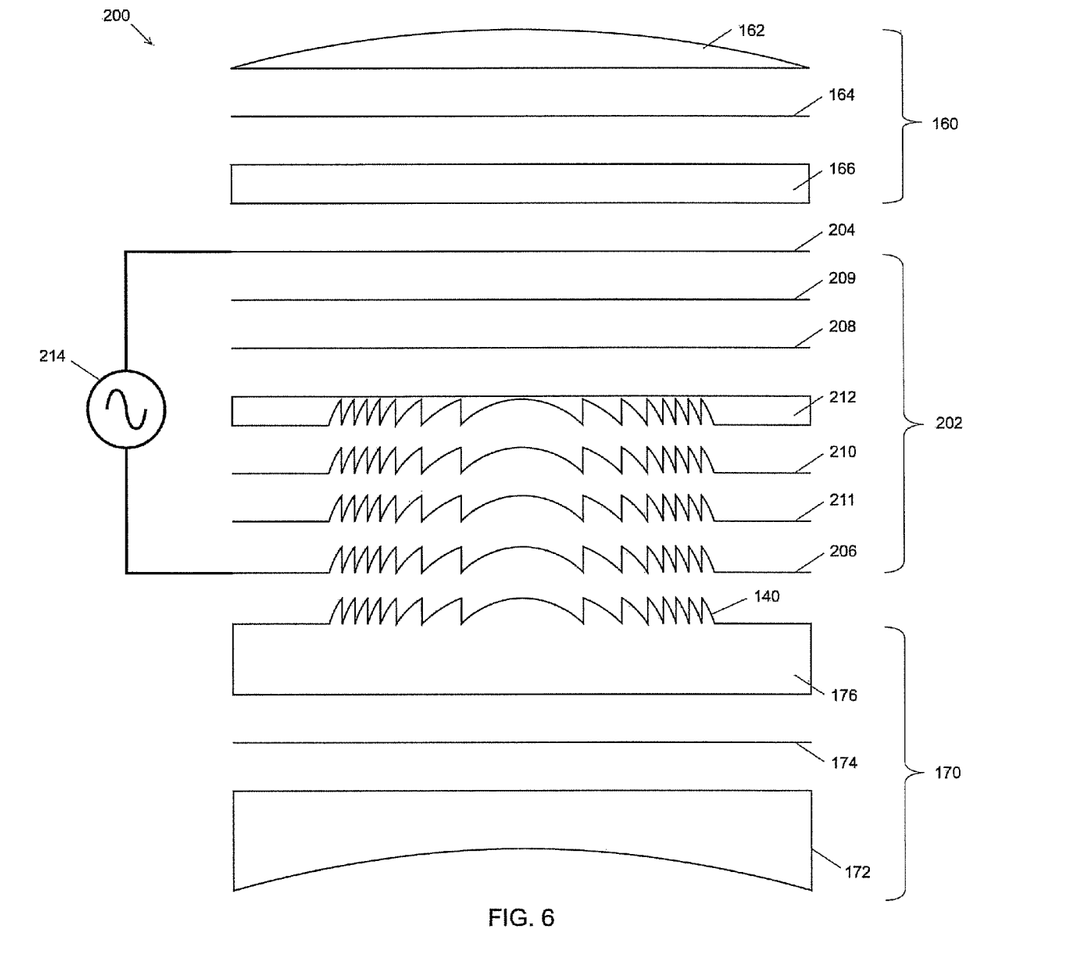
FIG. 6 shows a side view of layers of a lens 200 including an electro-active diffractive addition region.

FIG. 6 shows a side view of layers of an electro-active lens 200 having an electro-active diffractive addition region 202 for making the diffractive addition region in embodiments of the previous figures electro-active.

The electro-active diffractive addition region 202 may include transparent electrodes 204 and 206, alignment layers 208 and 210, electro-active material 212, electrical insulating layers 209 and 211, and drive electronics 214. The diffractive addition region may be disposed between a front piece 160 and a back piece 170 of the lens. The diffractive addition region may be on optical communication with the MOD surface relief structure 140, the WSD surface relief structure (not shown), or the combined MOD and WSD surface relief structures (not shown). Thus, each of the electro-active diffractive addition region 202, transparent electrode 206, the alignment layer 210, the electrical insulating layer 211, and the inner surface of the back piece 170, conforms to the topological profile of the MOD surface relief structure 140, the WSD surface relief structure (not shown) or the combined MOD+WSD surface relief structure topography (not shown).

The electro-active material 212 may include, for example, a nematic liquid crystal or a cholesteric liquid crystal (CLC). CLC is typically preferred, since the material may allow for the focusing of light having substantially any polarization state and is thereby termed, "polarization insensitive", as is described in U.S. Ser. No. 12/018,048, filed on 22 Jan. 2008, entitled "Cholesteric Liquid Crystalline Material" and U.S. Pat. No. 5,712,721 to Large, which are both incorporated herein by reference.

The CLC has a refractive index that changes between an average refractive index, $n_{avg}$ (e.g., approximately in a range of 1.62 to 1.70, and preferably 1.67) when no electrical potential is applied thereto, and an ordinary refractive index, $n_o$ (e.g., approximately in a range of 1.50 to 1.57, and preferably 1.52) when sufficient electrical potential is applied across the electrodes 204 and 206. Other intermediate refractive indices, n, where $n_o < n < n_{avg}$, may be achieved when intermediate electrical potentials are applied to the CLC.

The refractive index of the front and back pieces 160 and 170 may be approximately equal to the average refractive index, $n_{avg}$, of the CLC. Thus, when no power is applied across the electrodes, the refractive index of the CLC matches the refractive index of the front and back pieces, and the electro-active diffractive optical power region 202 contributes no optical power. Such a lens may provide fail-safe operation (contributing zero additional optical power in the electrical off state).

When a suitable voltage is applied across the electrodes, the refractive index of the CLC is approximately equal to the ordinary refractive index, $n_o$. The ordinary refractive index of the CLC does not match the refractive index, $n_{avg}$, of the front and back pieces of the lens. This mismatch is such that proper phase retardation results (e.g., in integer multiples of $2\pi$), leading to a high diffraction efficiency of the lens.

Each of the front and back pieces 160 and 170 may include refractive front and back components 162 and 172, respectively, to correct static refractive errors of the eye. Each of the front and back pieces 160 and 170 may include a component 166 having a flat or plano surface topography and a component 176 having the MOD surface relief structure or the combined MOD and WSD surface relief structures (not shown). Adhesive layers 164 and 174 may attach front component 162 to component 166 and back component 172 to component 176, respectively. The progressive addition surface (not shown) may be formed on one or both of the front and/or back surfaces of the lens.

Although the particular embodiments shown and described above will prove to be useful in many applications in the optical arts to which the present invention pertains, further modifications of the present invention will occur to persons skilled in the art. All such modifications are deemed to be within the scope and spirit of the present invention as defined by the appended claims.

What is claimed is:

1. A multi-focal spectacle lens having far distance, intermediate distance, and near distance vision correction, comprising:
    a. a progressive addition surface with a progression of optical power;
    b. a multi-order diffractive surface relief structure with an optical add power for reducing chromatic aberrations, wherein when the progressive addition surface and the multi-order diffractive surface relief structure are in optical communication an overall progression of optical add power is provided by the combination of the progressive addition surface with the multi-order diffractive surface relief structure; and
    c. the diffractive structure comprises electro-active material.

2. The lens of claim 1, wherein the electro-active material comprises cholesteric liquid crystal.

3. The lens of claim 1, further comprising a wavefront splitting device in optical communication with the multi-order diffractive surface relief structure.

4. The lens of claim 1, further comprising a thin film layer in optical communication with the progressive addition surface.

5. An ophthalmic lens having far distance, intermediate distance, and near distance vision correction, comprising:
    a. a front piece having a convex front surface;
    b. a back piece having a concave rear surface; and
    c. a multi-order diffractive surface relief structure positioned between the front piece and the back piece, wherein said multi-order diffractive surface relief structure has an optical add power and reduces chromatic aberration;
    d. a portion of a progressive addition surface provided on at least one of the front surface or the rear surface in optical communication with the multi-order diffractive surface relief structure, wherein an overall progression of optical add power is provided by the addition of the progressive addition surface and the optical add power of the diffractive lens structure; and
    e. the diffractive structure comprises electro-active material.

6. The lens of claim 5, wherein the electro-active material comprises cholesteric liquid crystal.

7. The lens of claim 5, further comprising a wavefront splitting device disposed between the front piece and the back piece, wherein the wavefront splitting device is in optical communication with the multi-order diffractive surface relief structure.

8. The lens of claim 5, further comprising a thin film layer disposed between the front piece and the back piece, wherein the thin film layer is in optical communication with the progressive addition surface.

9. The lens of claim 5, wherein the refractive index of the front piece is different than the refractive index of the back piece.

10. The lens of claim 5, wherein the refractive index of the front piece is the same as the refractive index of the back piece.

11. The lens of claim 10, wherein the refractive index of the thin film is different from the refractive index of the front and back pieces.

12. The lens of claim 8, wherein the refractive index of the thin film is different from the refractive index of the front piece and different than the refractive index of the back piece.

13. The lens of claim 5, wherein all of the optical power contributed by the progressive addition surface is provided on the front surface.

14. The lens of claim 5, wherein all of the optical power contributed by the progressive addition surface is provided on the rear surface.

15. The lens of claim 5, wherein a portion of the optical power contributed by a progressive addition surface is provided on the front surface and the remaining optical power contributed by a progressive addition surface is provided on the rear surface.

* * * * *